US009485643B2

(12) United States Patent
Schmitz et al.

(10) Patent No.: US 9,485,643 B2
(45) Date of Patent: Nov. 1, 2016

(54) METHOD AND SYSTEMS FOR SECURE MESSAGE TRANSMISSION

(71) Applicant: SWN Communications, Inc., New York, NY (US)

(72) Inventors: Anthony Schmitz, Clifton, NJ (US); Alexandros Tsepetis, Wenham, MA (US)

(73) Assignee: SWN Communications, Inc.

( * ) Notice: Subject to any disclaimer, the term of this patent is extended or adjusted under 35 U.S.C. 154(b) by 108 days.

(21) Appl. No.: 14/305,160

(22) Filed: Jun. 16, 2014

(65) Prior Publication Data

US 2015/0100653 A1  Apr. 9, 2015

Related U.S. Application Data

(60) Provisional application No. 61/888,565, filed on Oct. 9, 2013, provisional application No. 61/888,569, filed on Oct. 9, 2013.

(51) Int. Cl.

| G06F 15/16 | (2006.01) |
|---|---|
| H04W 4/22 | (2009.01) |
| H04W 64/00 | (2009.01) |
| H04W 4/12 | (2009.01) |
| H04L 12/58 | (2006.01) |
| G06F 17/30 | (2006.01) |
| H04L 29/06 | (2006.01) |
| H04L 12/18 | (2006.01) |

(52) U.S. Cl.
CPC ............ *H04W 4/22* (2013.01); *G06F 17/3023* (2013.01); *H04L 51/043* (2013.01); *H04L 51/24* (2013.01); *H04L 63/04* (2013.01); *H04W 4/12* (2013.01); *H04W 64/00* (2013.01); *H04L 12/1895* (2013.01)

(58) Field of Classification Search
CPC ............ H04L 12/1895; H04L 63/104; H04L 12/581; H04L 51/04; H04L 51/14
USPC ........................................................ 709/206
See application file for complete search history.

(56) References Cited

U.S. PATENT DOCUMENTS

| 6,711,608 B1* | 3/2004 | Ogilvie ................ G06Q 10/107 709/202 |
|---|---|---|
| 7,224,373 B1 | 5/2007 | Duarte |
| 7,729,684 B1 | 6/2010 | Straub |
| 8,176,562 B1 | 5/2012 | Hernacki |
| 8,320,875 B2 | 11/2012 | Musgrove |
| 2002/0107930 A1* | 8/2002 | Itoh ........................ H04L 51/28 709/206 |
| 2003/0105716 A1 | 6/2003 | Sutton |
| 2004/0267707 A1 | 12/2004 | Hayes-Roth |

(Continued)

*Primary Examiner* — Ruolei Zong
(74) *Attorney, Agent, or Firm* — Jennifer Meredith, Esq.; Meredith & Keyhani, PLLC

(57) ABSTRACT

Methods and systems for secure message transmission from a computing device of a sender to at least one recipient, the method comprising iteratively selecting a group until the sender indicates conclusion of the group to provide a selected group, selecting at least one recipient from each selected group to provide at least one selected recipient, composing a message to provide a composed message, selecting at least one device for each selected recipient to provide at least one selected device, wherein the composed message is to be dispatched to the at least one selected device, and indicating an alert notification on each of the at least one selected devices of the recipient, wherein the alert notification indicates dispatch of the composed message to the selected device.

29 Claims, 17 Drawing Sheets

(56) References Cited

U.S. PATENT DOCUMENTS

| | | |
|---|---|---|
| 2005/0044159 A1 | 2/2005 | Niemi |
| 2005/0091289 A1 | 4/2005 | Shappell |
| 2005/0181775 A1* | 8/2005 | Rideout, Jr. ......... G06Q 10/109 455/414.3 |
| 2008/0140732 A1 | 6/2008 | Wilson |
| 2009/0182833 A1 | 7/2009 | Balasubramanian |
| 2010/0003949 A1 | 1/2010 | Ray |
| 2012/0054156 A1 | 3/2012 | Mason |
| 2012/0089569 A1 | 4/2012 | Mason |
| 2013/0173530 A1 | 7/2013 | Laron |
| 2014/0351346 A1 | 11/2014 | Barton |
| 2015/0081630 A1 | 3/2015 | Linsalata |

* cited by examiner

METHOD AND SYSTEMS FOR SECURE MESSAGE TRANSMISSION

BACKGROUND

1. Field of Disclosure

The present disclosure generally relates to secure file transmission from a computing device of a sender to a computing device of a recipient.

2. Brief Description of Related Art

In the recent years, short message service (SMS) has been widely used by a large number of domestic users as well as by several commercial franchises. At the domestic end, SMS may typically be used for communicating with family and friends, while at the commercial end, SMS may be used for marketing, advertisement, emergency alert notifications, and the like. Conventional SMS systems are known for expensive usage fees where charges may apply for each segment when sending an emergency notification alert. The emergency alert message dispatch costs may accrue exponentially when an alert message is to be transmitted to a large number of subscribers dispersed all around the world.

Additionally, the conventional SMS systems typically have a limited number of characters and limited length of content, for example SMS may typically allow a message having up to 140 characters. A sender may not have visual formatting options while composing a message using the traditional SMS. Likewise, the existing SMS systems transmit messages from end to end as plain text. A sender of a message is neither guaranteed end-point delivery nor a return receipt notification. After sending a message, an SMS user does not have access to diagnostics services for tracking down the transmitted message. The only option the sender may have is to spend hours resolving SMS delivery issues with the operators. This can be harmful, especially when time sensitive or confidential information is to be transmitted to a large group of customers.

Also, a sender may not have visual formatting options while composing a message using traditional SMS. Likewise, existing SMS systems transmit messages from end to end as plain text. A sender of a message is neither guaranteed end-point delivery nor a return receipt notification.

The present invention provides a secure communication link, which may be two way, between a sender and a recipient to exchange confidential information in a timely manner. This may be a two way communication link between a sender and at least one recipient wherein one of the provided choices may be selected by the recipient in order to provide a feedback to the sender. Conventional SMS does not have a capability to establish a two way connection. It is therefore desirable to have a message transmission system that can replace existing SMS, which can transmit messages that are encrypted end to end, can provide return receipt notification and can dispatch rich text capable (HTML) messages. It is also desirable to have a message transmission system that can economically provide unlimited usage, unlimited message size, and simple administration to allow a sender to easily transmit any number of messages to any number of recipients regardless of the message size.

BRIEF SUMMARY

According to one aspect of the present invention, a method for secure message transmission from a computing device of a sender to at least one recipient is provided, the method comprising: iteratively selecting a group until the sender indicates conclusion of the group selection to provide a selected group; selecting at least one recipient from each selected group to provide at least one selected recipient; composing a message by inputting into a computing device of a sender the sender contact information, a message subject and message text to provide a composed message; selecting at least one device for each of the at least one selected recipients to provide at least one selected device, wherein the composed message is to be dispatched to the at least one selected device; and indicating an alert notification on each of the at least one selected devices of the recipient, wherein the alert notification indicates dispatch of the composed message to each of the at least one selected devices.

According to another aspect of the present invention, a secure message transmission system for dispatching messages from a computing device of a sender is provided, the system configured to: iteratively select a group until the sender indicates conclusion of the group selection to provide a selected group; accept a selection of at least one recipient from each selected group to provide at least one selected recipient; accept a message input by a sender into a computing device and including at least the sender contact information, a message subject and message text to provide a composed message; accept a selection by the sender into a computing device of at least one device for each selected recipient to provide at least one selected device, and dispatching the composed message to each of the at least one selected devices; and indicate an alert notification on each of the at least one selected devices, wherein the alert notification indicates dispatch of the composed message to each of the at least one selected devices.

The foregoing discussion of the preferred embodiments has been provided only by way of introduction. Nothing in this section should be taken as a limitation of the claims, which define the scope of the invention.

DETAILED DESCRIPTION OF THE PRESENTLY PREFERRED EMBODIMENTS

Figure 1:
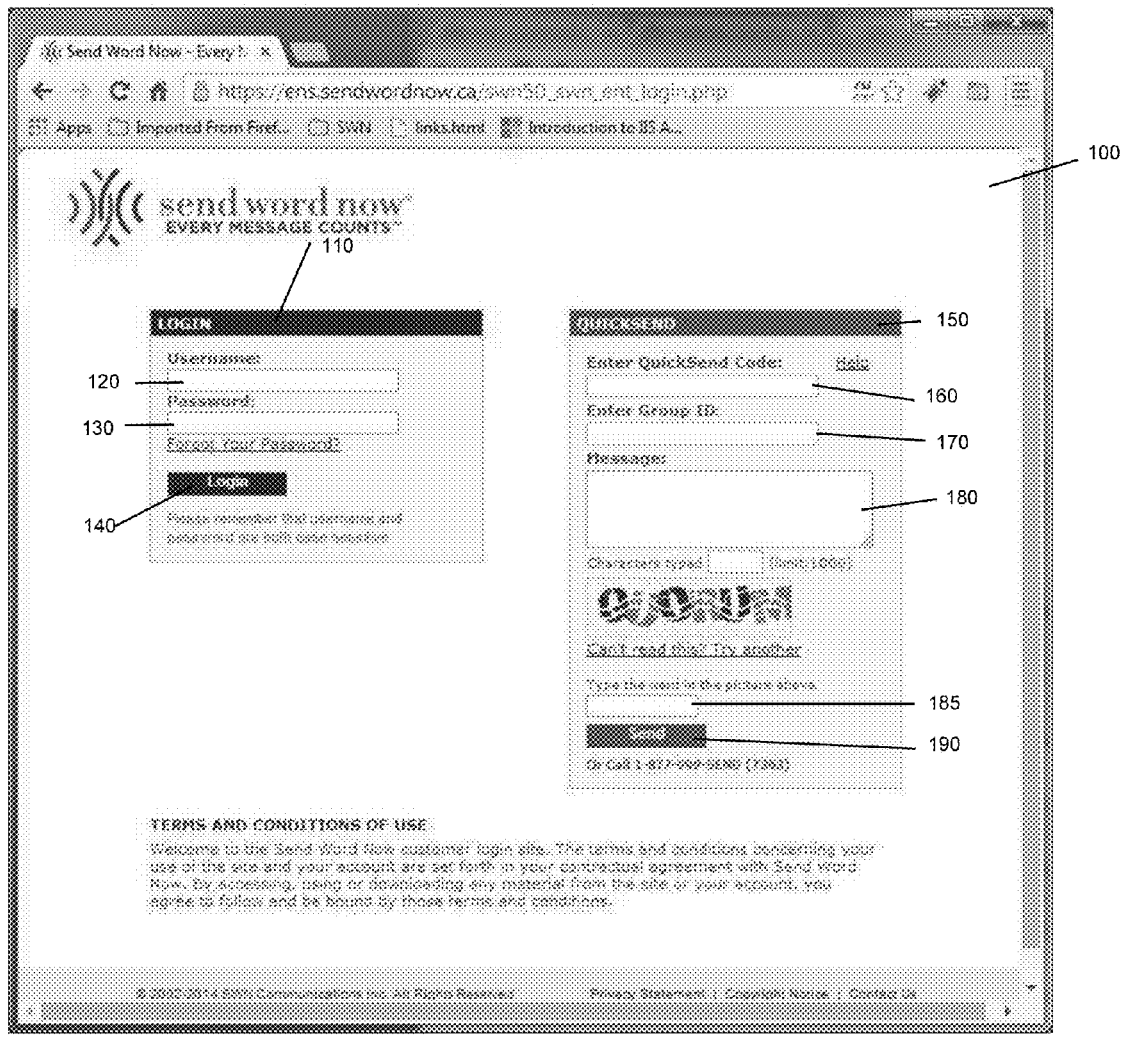
FIG. 1 depicts a user credential verification interface of the disclosed system.

The present disclosure describes computer implemented systems and methods, that may utilize an algorithm, for use in a graphical user interface employing secure file transmission. According to one embodiment, a method for secure message transmission from a computing device of a sender to at least one recipient is provided, the method comprising the steps of: iteratively selecting a group until the sender indicates conclusion of the group selection to provide a selected group; selecting at least one recipient from each selected group to provide at least one selected recipient; composing a message by inputting into a computing device of a sender the sender contact information, a message subject and message text to provide a composed message; selecting at least one device for each of the at least one selected recipients to provide at least one selected device, wherein the composed message is to be dispatched to the at least one selected device; and indicating an alert notification on each the at least one selected devices of the recipient, wherein the alert notification indicates dispatch of the composed message to each of the at least one selected devices. As would be understood by one of ordinary skill in the art, every aspect of the present invention may be implemented by a computing device. The term computing device and/or device may include, without limitation, a personal computer, laptop, handheld device, smart phone, iphone®, ipad®, Galaxy® or any other device that may be introduced in the future.

The method may further comprise the step of selecting at least one of: all of the at least one devices of the recipient, voice devices of the recipient, or text devices of the recipient for dispatching the composed message. There may also be the step of selecting a specify devices option to select at least one of: express voice device of the recipient, express messenger device of the recipient, or the office email device of the recipient for dispatching the composed message. There may be the step of the sender defining the message transmission attributes by selecting message delivery features. Each of these steps may be accomplished by a sender selecting or inputting this information into a computing device. It should be noted that a sender may use multiple computing devices and does not need to input information into the same computer. The composed message may be a rich text supported HTML message.

The method may further comprise the step of selecting at least one of: a get word back feature, message template feature, instant message service feature, voice recording feature, configure intro feature, direct feature, conference bridge feature, PIN code feature, cascade feature, message board options feature, alert links feature, or schedule alert feature for defining the message transmission attributes. Each of these steps may be accomplished by a sender selecting or inputting this information into a computing device.

The method may further comprise the steps of: defining, by the sender in a computing device, at least one query and at least two responses to provide at least one defined query and at least two defined responses; presenting the at least one defined query and the at least two defined responses to the recipient, the recipient answering the at least one defined query by selecting at least one of the at least two defined responses to provide selected responses; and communicating the selected responses to the computing device of the sender. This is described in detail below with reference to FIGS. 14 and 15.

The method may further comprise the steps of: selecting a vanish option step for delivering the composed message to at least one selected device, wherein the vanish option causes secured dispatch of the composed message. The vanish option also may comprise the step of causing the composed message to vanish upon the recipient viewing the composed message. This is described in detail below with reference to FIGS. 5, 16 and 17. The composed message may be encrypted end-to-end.

There may be the step of providing an audience visibility indicator on a computing device of a sender, wherein the audience visibility indicator indicates, for each composed message to be dispatched to the at least one selected device, that the selected device is immediately reachable or is unavailable. By way of example, the selected device is immediately reachable if it is a mobile phone and currently has service. The selected device is unavailable if it is a mobile phone and does not currently have service. These are by way of example, only, and not to be taken in a limiting sense. The present invention may also include the step of providing a delivery receipt on a computing device of a sender, wherein the delivery receipt indicates delivery, or non-delivery, of the composed message to each of the at least one selected devices. As indicated previously, existing SMS systems transmit messages from end to end as plain text. A sender of an SMS message is neither guaranteed end-point delivery nor a return receipt notification. After sending a message SMS user does not have access to diagnostics services for tracking down the transmitted message. The only option the sender may have is to spend hours resolving SMS delivery issues with the operators. The present invention allows for easy tracking and confirmed receipt (or non-receipt) of messages. This can be particularly important for companies, universities and larger scale applications to ensure delivery to a wide group of recipients. Also, the present invention provides security, as well as an audit trail and version control. Also, there is audience visibility, as the sender knows there are not Wi-Fi or Cellular Data connectivity challenges.

The present invention also provides a secure message transmission system for dispatching messages from a computing device of a sender, the system configured to: iteratively select a group until the sender indicates conclusion of the group selection to provide a selected group; accept a selection of at least one recipient from each selected group to provide at least one selected recipient; accept a message input by a sender into a computing device and including at least the sender contact information, a message subject and message text to provide a composed message; accept a selection by the sender into a computing device of at least one device for each selected recipient to provide at least one selected device, and dispatching the composed message to each of the at least one selected devices; and indicate an alert notification on each of the at least one selected devices, wherein the alert notification indicates dispatch of the composed message to each of the at least one selected devices. The system is further configured to accept a selection, for dispatching the composed message, by the sender into a computing device, of at least one of: all devices of the recipient, voice devices of the recipient, or text devices of the recipient. The system is further configured to accept a specify devices option, by the sender into a computing device, to select at least one of: express voice device of the recipient, express messenger device of the recipient, or office email device of the recipient for dispatching the composed message. The composed message may have defined message transmission attributes. The composed message may also have selected message delivery features. The composed message may be an express voice alert as an audio file that is encrypted across the network and on the device. This may also be referred to as end-to-end encryption. The composed message may also be an express messenger alert that is encrypted across the network and on the device (end-to-end encrypted).

The system may be further configured to accept a selection by a sender into a computing device of at least one of the following: get word back feature; message template feature; instant message service feature; voice recording feature; configure intro feature; direct feature; conference bridge feature; PIN code feature; cascade feature; message board options feature; alert links feature; or schedule alert feature to define the message transmission attributes. The get word back feature establishes a two way communication link between the sender and the recipient.

The system may be configured to accept an input, by a sender into a computing device, to define at least one query and at least two responses to provide at least one defined query and at least two defined responses, to present the at least one defined query and the at least two defined responses to at least one selected device. The selected recipient provides an input to answer the defined query by selecting at least one of the at least two defined responses in the selected device to provide a response selection, and the selected device communicates the response selection to the computing device of the sender.

The system may be further configured to accept a selection of the direct feature and a vanish option, by the sender into a computing device, to securely deliver the composed message to at least one selected device. The composed message is securely dispatched. The vanish option provides that the composed message is deleted from the selected device after the selected recipient views the composed message. The composed message may be a rich text supported HTML message.

The system may be further configured to select the direct feature and to schedule a periodic message re-delivery to attempt repeated delivery of an undelivered message. There may be a delivery receipt provided on a computing device of a sender, wherein the delivery receipt indicates delivery, or non-delivery, of the composed message to each of the at least one selected devices. The present invention may also provide an audience visibility indicator on a computing device of a sender, wherein the audience visibility indicator indicates, for each composed message to be dispatched to the at least one selected device, that the selected device is immediately reachable or is unavailable. This allows the sender to track the visibility of their audience.

FIG. 1 depicts a user credential verification interface 100 according to a preferred embodiment of the disclosed invention. The disclosed communication system is a secured file transmission system. Accordingly, login interface 110 may include username input area 120 and password input area 130 where a sender may input username and password for validation purposes. Then the sender may select login option 140 to continue the validation process before using the secured file transmission system. Alternatively, the Quick-send interface 150 may be used to send a message by providing a quicksend code 160 and group id 170 before entering the message in the message input area 180. The sender may be required to enter text in input area 185 to ensure that the given input is provided by a human being and not by a machine. The sender may then select submit or send option 190 to conclude the credentials input process.

Figure 2:
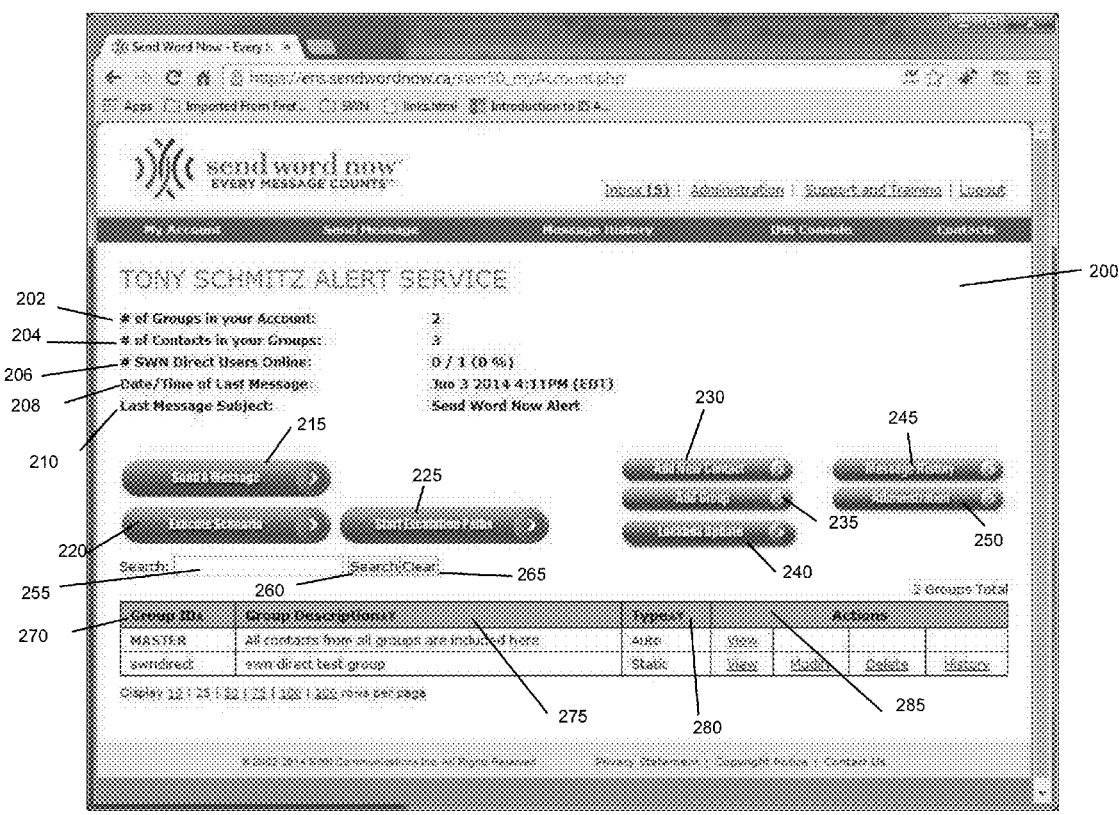
FIG. 2 illustrates an alert service main interface according to a preferred embodiment of the disclosed system.

FIG. 2 illustrates alert service main interface 200 according to a preferred embodiment of the disclosed system. Upon successful login into the system, alert service main interface 200 is displayed to the sender. Main interface 200 depicts number of groups in sender account 202, total number of contacts in the sender's group 204, and total number of SWN users online 206. Further, interface 200 also indicates date and time of last message 208 and subject of last message 210. This feature informs a sender how many SWN users are online even before the sender designates a recipient or selects a file to be transmitted to the recipient.

Unlike conventional SMS systems, where sender does not know whether or not the target recipient is online, and reachable, the disclosed system has the ability to precisely inform the sender of the recipient's online or offline status. A member is shown as an online member if the member has SWN application installed on their phone, the member's phone is turned on and the member has a connection. The master group may comprise the other entire group while swndirect group may include the members of swndirect group. A static group may be formed by placing members in a group based on the member's identity. A dynamic group may be formed based on attributes that define people, for example, a dynamic group may include all lawyers, all passengers on Metra, all sailors in lake Michigan. It is often critical when it is necessary to address a group of people. One example of this may be during an emergency.

A sender may select send message option 215 to send message, or create a test scenario by selecting option 220. Alternatively, the sender may start escalation procedures by selecting start escalation paths option 225. Additionally, the sender may add new contacts, add groups, view lockbox updates, view message history, and perform administrative functions by selecting options 230, 235, 240, 245, and 250 respectively. The sender may conduct a search for a group name or a recipient name by entering the group or recipient name in the input area 255 and selecting search option 260. The text entered in the input area 255 can be purged by selecting clear option 265. The interface 200 displays group id 270, group description 275, group types 280 and actions 285 that can be performed on the listed groups. Two groups, master and swndirect are listed on the interface 200. Upon selecting the send message option 215, the interface 300 illustrated in FIG. 3 is displayed to the sender.

Figure 3:
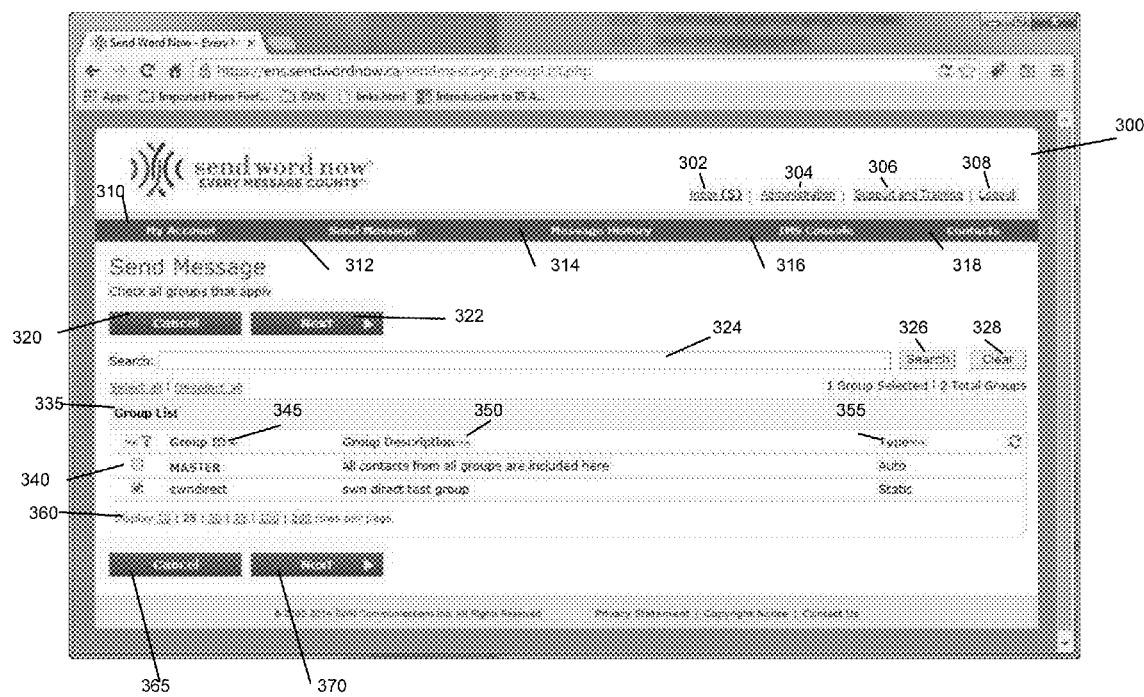
FIG. 3 depicts a send message main interface according to a preferred embodiment of the disclosed system.

FIG. 3 depicts send message main interface 300 for selecting a group according to the preferred embodiment of the disclosed system. The sender may view inbox items by selecting inbox option 302, perform administrative functions by selecting administration option 304. The support and training can be performed by selecting support and training option 306. Likewise, the sender can log out of the system by selecting logout option 308. The sender account details can be viewed by selecting my account option 310, sender may dispatch a text or voice message by selecting send message option 312. The sender may review message history by selecting message history option 314, and launch IMS console by selecting option 316 or contact customer service by selecting contact us option 318. The sender may proceed with sending message by selecting next options 322 and 370 or abort message transmission by selecting cancel options 320 and 365.

The sender may conduct a search for a group name or a recipient name by entering the group or recipient name in the input area 324 and selecting search option 326. The text entered in the input area 324 can be purged by selecting clear option 328. The interface 300 displays group id 345, group description 350, group types 355 and group selection box 340 that can be used to select the listed groups. Page display can be configured by selecting display option 360. Two groups, master and swndirect are listed and group swndirect is selected on the interface 300.

Figure 4:
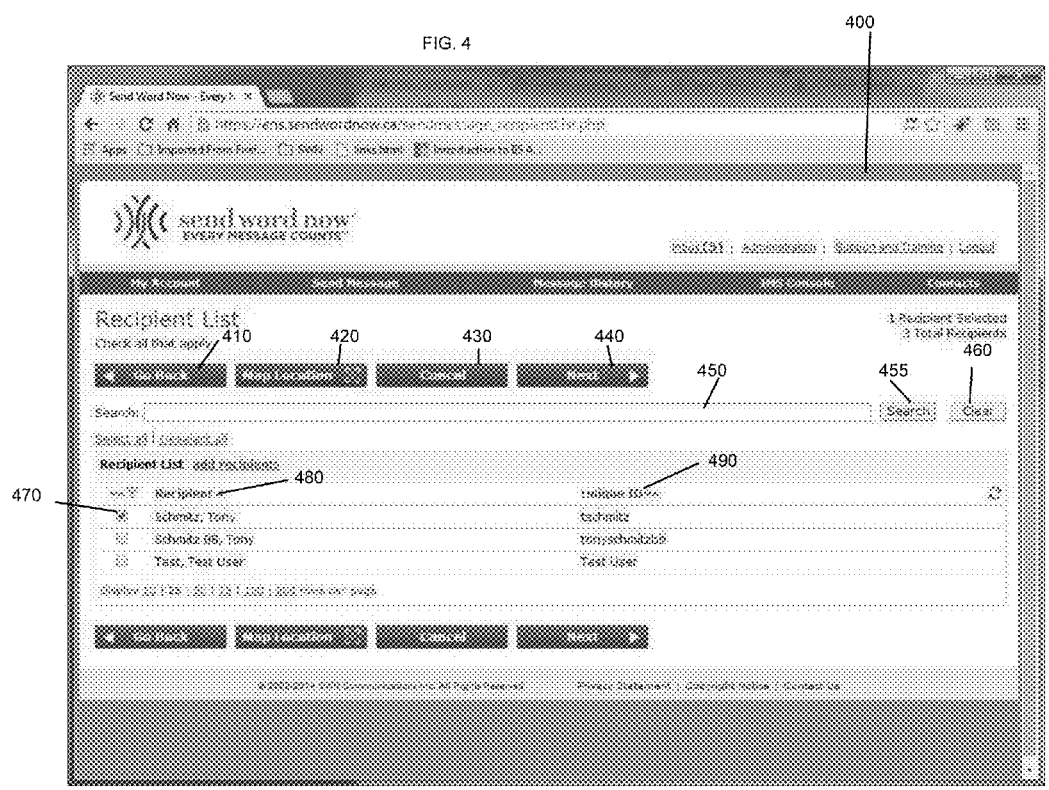
FIG. 4 depicts a recipient list main interface according to a preferred embodiment of the disclosed system.

FIG. 4 depicts send recipient main interface 400 according to the preferred embodiment of the disclosed system. The sender may go back to selecting group interface 300 by selecting go back option 410, sender may map the location of the selected recipient by selecting map location option 420. The sender may proceed with sending message by selecting next option 440 or abort message transmission by selecting cancel option 430. The sender may conduct a search for a group name or a recipient name by entering the group or recipient name in the input area 450 and selecting search option 455. The text entered in the input area 450 can be purged by selecting clear option 460. The interface 400 further illustrates recipient name 480, unique id 490, and selection box 470 that can be checked to select the listed recipients. Three recipients are listed on the interface 400. Upon selecting next option 440 on interface 400, the interface 500 illustrated in FIG. 5 is displayed to the sender.

Figure 5:
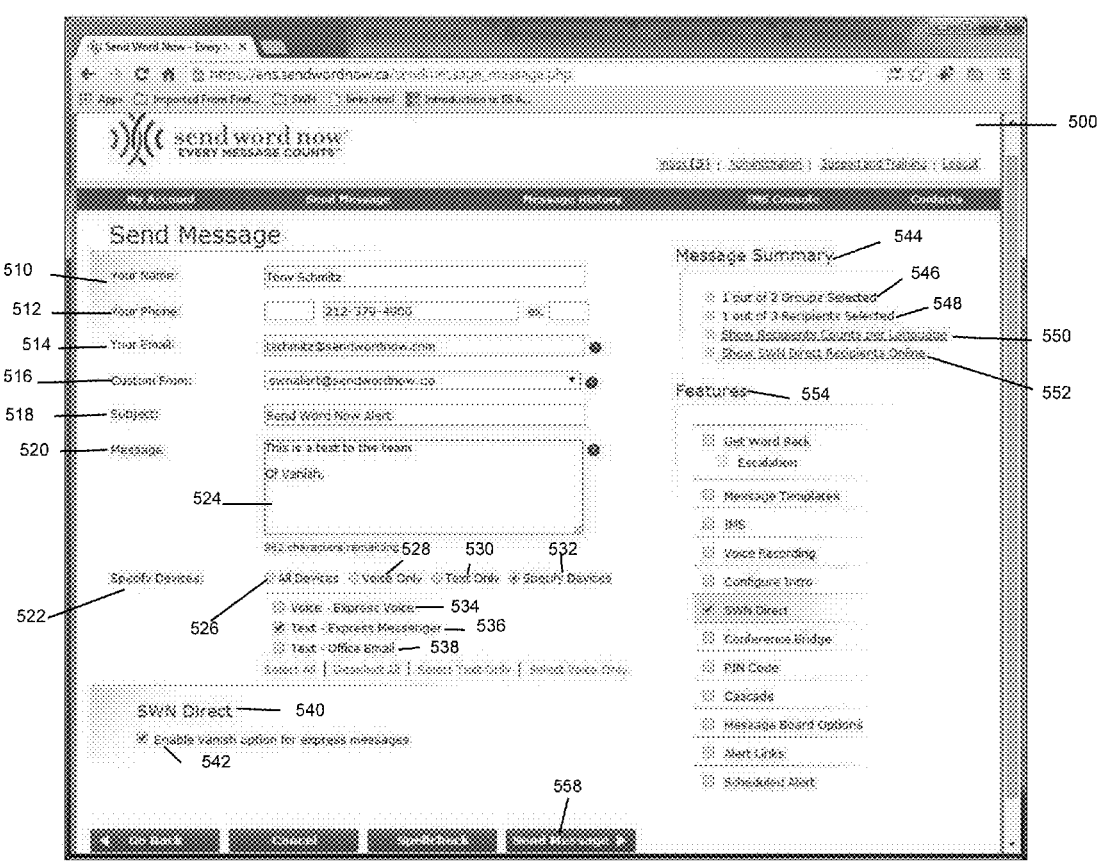
FIG. 5 shows a message compose interface whereby a sender may compose a message for a recipient.
Figure 8:
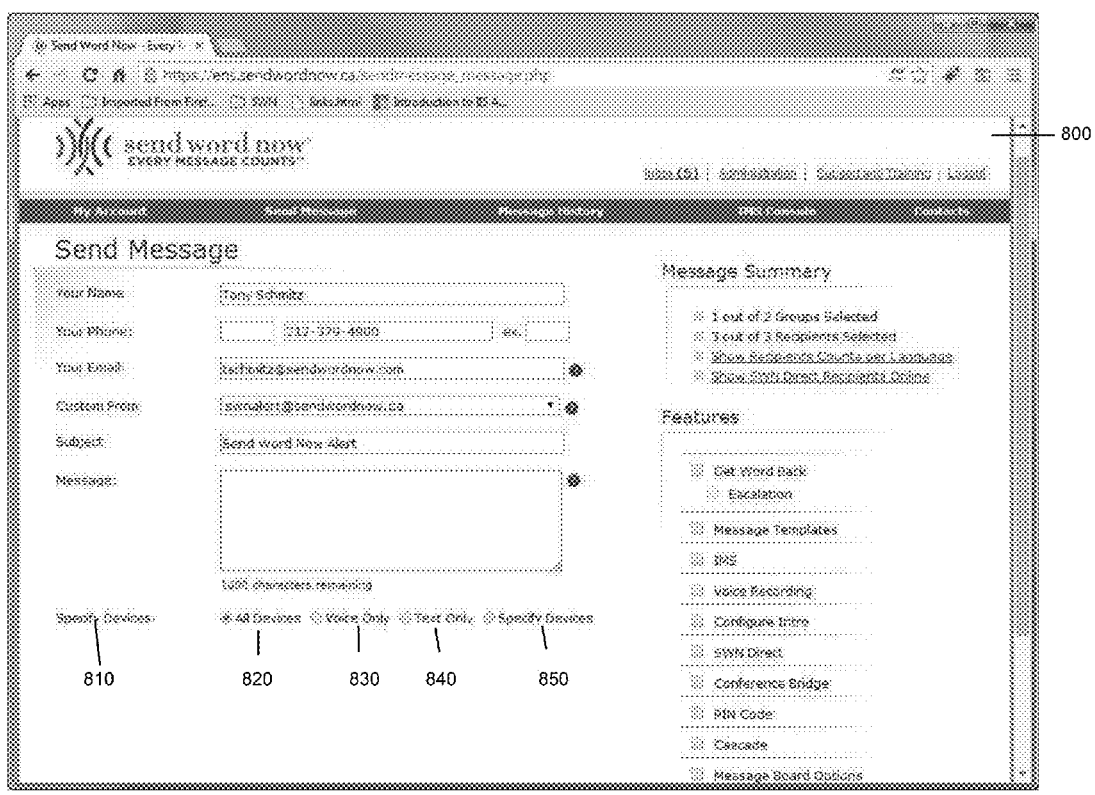
FIG. 8 shows a scenario where the sender has selected the specify devices option.

FIG. 5 shows a message compose interface whereby a sender may compose a message for a recipient. The sender composes a message by providing the sender contact information such as the sender name 510, the sender phone number 512, and the sender email 514. The sender may upload a custom message from a location situated on the first computing device by selecting the custom from 516 pull down menu. Alternatively, the sender may input a message 520 using the message form 524 to compose the message. Additionally, the sender may specify a message subject 518. Thereafter, the sender may specify recipient devices 522 for dispatching the composed message. The sender may specify devices by selecting all devices of the recipient option 526, this scenario is illustrated in FIG. 8.

Now referring back to FIG. 5, where the sender may specify devices by selecting only the recipient's voice devices, this is depicted as the voice only option 528. Likewise, the sender may choose to select recipient's text devices, this is depicted as the text only option 530. Alternatively, the sender may select a specify devices option 532 to select at least one of: the recipient's express voice device option 534, the recipient's express messenger device option 536 or the recipient's office email device option 538 for dispatching the composed message.

In the interface 500, the sender has selected the recipient's express messenger device option 536. After the sender selecting the send message option 558, the message may appear in the alert center at the recipient's selected device. According to one embodiment of the disclosed invention, an exclamation point on the received message may indicate that the received message is sent with a vanish option. Once the recipient reads the message and clicks on back arrow 1670 and 1730 (depicted in FIGS. 16 and 17 respectively) to get back to the alert center the message vanishes, keeping the confidential information in the message safe. This is an example of the sender enforcing a vanish option on a message. Alternatively, recipient can also turn the vanish option on via the settings menu.

The disclosed invention may implement making a phone call using Session Initiation Protocol (SIP) for sounding ring, invoking busy tone, call waiting etc. Further the disclosed method may employ SIMPLE to deliver audio packets across wire, for example in implementing emergency message dispatch and lock box delivery. For example, a sender may send a message to a recipient's iPhone and the recipient's blackberry. The iPhone is on-net if the SWN software is installed on the iPhone and the phone is connected (there are no Wi-Fi or Cellular Data connectivity challenges). The SWN software may be not be installed on a blackberry. The swn direct is the container which has the ability to send message, initiate phone calls, receive calls and join conference calls. When a three way conference call is initiated by a sender between the sender, iPhone and blackberry then SWN direct is, in essence, mixing an on-net call with off net call. When the sender initiates three way calling between the sender, the iPhone and the blackberry the iPhone may ring instantaneously going over data network while the blackberry may ring at a later point in time since the blackberry uses PSTN to join the call. According to an alternate embodiment, Real-time Transport Protocol (RTP) may be used to deliver audio packets across wire, for example in implementing emergency message dispatch and lock box delivery.

Figure 9:
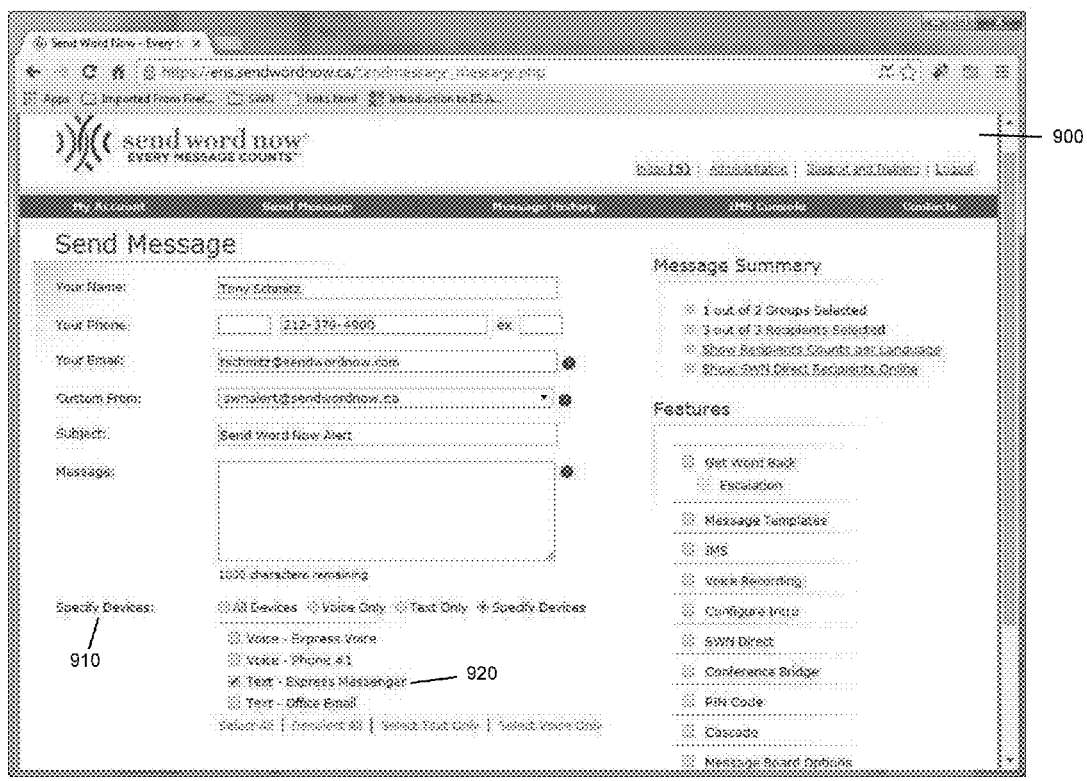
FIG. 9 depicts the selection of the express messenger device option according to one embodiment of the disclosed invention.

Now referring to FIG. 9 depicting the selection of the express messenger device option according to one embodiment of the disclosed invention. Similarly, the sender has selected a specify devices option 910 and subsequently selected the recipient's express messenger device option 920 on interface 900 shown in FIG. 9.

The sender may use the message summary 544 to add or delete groups or recipients. The message summary 544 on the interface 500 indicates group selection status 546, recipient selection status 548, recipient counts per language 550 and SWN direct users online 552. The sender has visibility of the online or offline status of the selected groups and of the specific recipients in the selected group.

The message summary 544 presents a multilayered direct audience visibility system that not only enables the sender to view which groups are online but the audience visibility system also enables the sender to know precisely which members of the selected group are online. This avails a novel feature of enhanced reliability wherein the sender has an ability to foresee whether an intended recipient is online or offline prior to dispatching the message to the intended recipient. Consequently, based on whether or not a given intended recipient is online or offline, the sender may select an appropriate device for communicating the message.

The sender may optionally select SWN direct feature 540 and enable vanish option 542 for express messages. By selecting the vanish option for delivering a first message comprising confidential information to a first recipient, the sender may cause secured dispatch of the confidential information. To maintain the confidentiality of the first message, the vanish option may cause the first message to vanish upon the first recipient viewing the first message. This feature may be helpful in protecting confidential information dispatched to the recipient's lost or stolen computing devices. Further, the sender may define the message transmission attributes by selecting one or more features from a set of message delivery features 554 which are discussed in detail in conjunction with FIG. 6.

Figure 6:
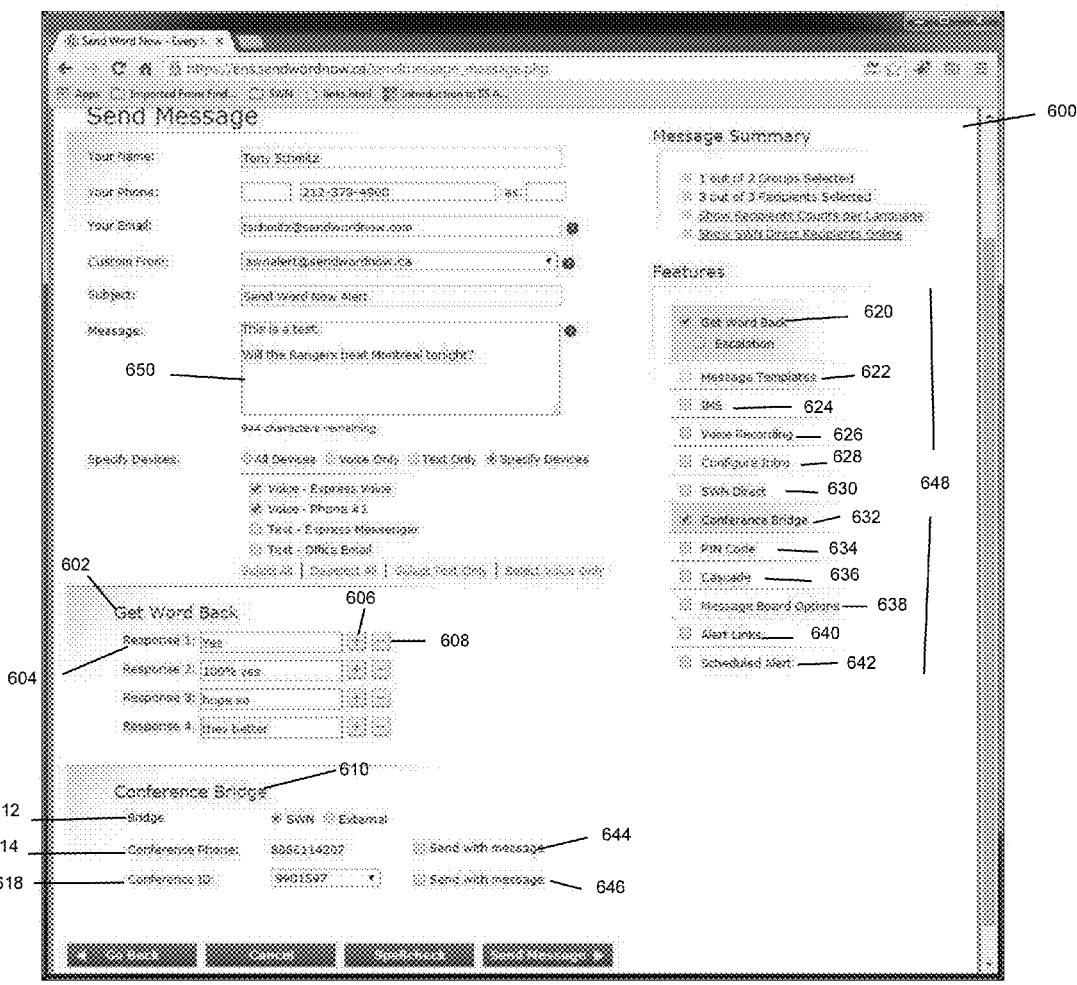
FIG. 6 illustrates a set of message delivery features that can be selected by a sender when composing a message.

The method may further comprise the step of selecting a get word back feature to establish a two way communication link between the sender and the at least one selected recipient. FIG. 6 shows the set of message delivery features 648 that can be selected by a sender while composing the message. The set of message delivery features 648 comprises a get word back feature 620, a message template feature 622, an instant message service feature 624, a voice recording feature 626, a configure intro feature 628, a SWN direct feature 630, a conference bridge feature 632, a PIN code feature 634, a cascade feature 636, a set of message board features 638, an alert links feature 640, or a scheduled alert feature 642 for defining the message transmission attributes.

When the sender selects the get word back feature 620, the get word back interface 602 is displayed. Prior to selecting the get word back feature 620, the sender may define at least one query. Interface 600 depicts a query 650 stating "Will the rangers beat Montreal tonight?" The sender may configure or add at least one response to the query by selecting option 606. If the sender is not satisfied with the configured response, then the sender may select a delete response option 608 to delete the unwanted response. Interface 600 shows four responses 604 stating Yes, 100% yes, hope so, and they better. The sender may present the query and the defined responses to the recipient, the recipient answering the query by selecting the response, and the recipient communicating the response selection to the sender. The alert links feature 640 illustrated on the interface 600 is described in detail in a related patent application to be submitted by the applicant.

The sender may also select a conference bridge feature 632 from the feature set to initiate a conference call. Upon selecting the conference bridge feature 632, a conference bridge interface 610 is displayed where the sender may select a bridge 612, view a conference phone 614 and a conference id 618. The sender may choose to send the conference phone 614 and the conference id 618 with a message by selecting options send with message 644 and send with message 646 respectively.

Figure 7:
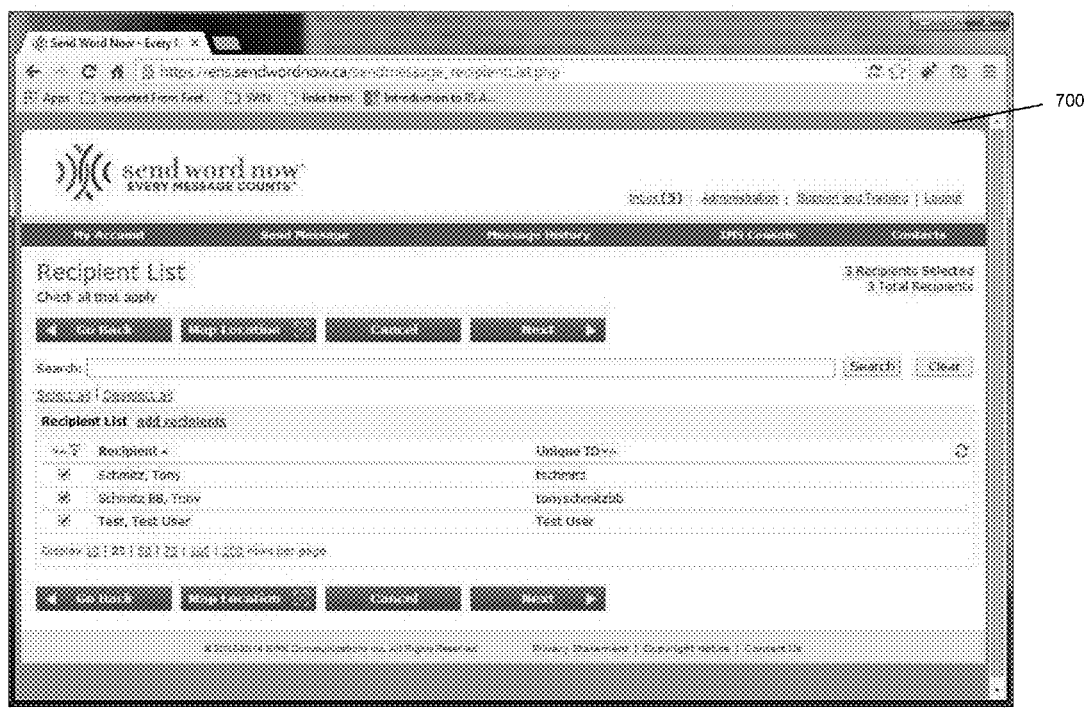
FIG. 7 depicts a manner in which recipients are selected according to one embodiment of the disclosed invention.

After composing the message as illustrated on the interface 600, the sender may select recipients. FIG. 7 depicts a manner in which recipients are selected according to one embodiment of the disclosed invention. As shown on the interface 700 two recipients are selected whom the sender intends to send the message that was composed on the interface 600.

FIG. 8 shows a scenario where the sender has selected the specify devices option 810. Resultantly, the sender is prompted to select, by way of example, one of four options all devices 820, voice only 830, text only 840, or specify devices 850. In the example depicted, the sender has selected all devices option 820 which indicates that the composed message is to be sent to all devices of the selected recipient.

FIG. 9 depicts selection of the express messenger device option according to one embodiment of the disclosed invention. Similarly, the sender has selected a specify devices option 910 and subsequently selected the recipient's express messenger device option 920 on interface 900 shown in FIG. 9.

Figure 10:
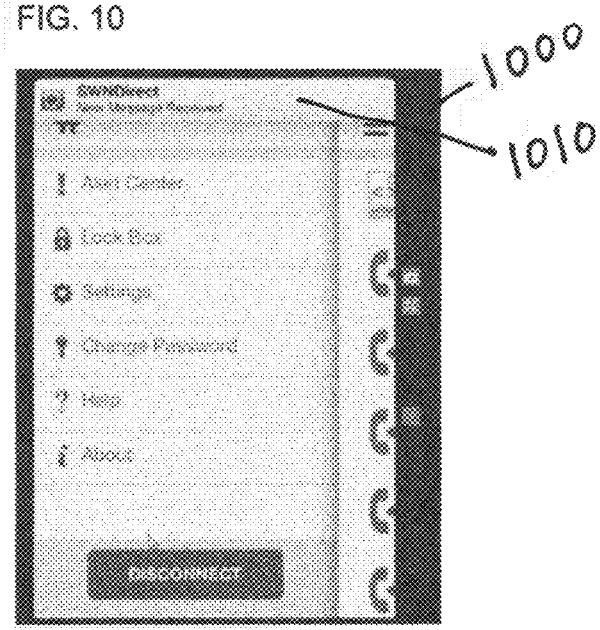
FIG. 10 depicts an alert notification indication on a device of the recipient according to one embodiment of the disclosed invention.

As shown in FIG. 10, interface 1000 depicts an alert notification 1010 on the device of the recipient, wherein the alert notification indicates dispatch of the sender composed message to the sender selected device of the recipient. The notification 1010 informs the recipient that a new message is received via SWN direct messaging service.

Figure 11:
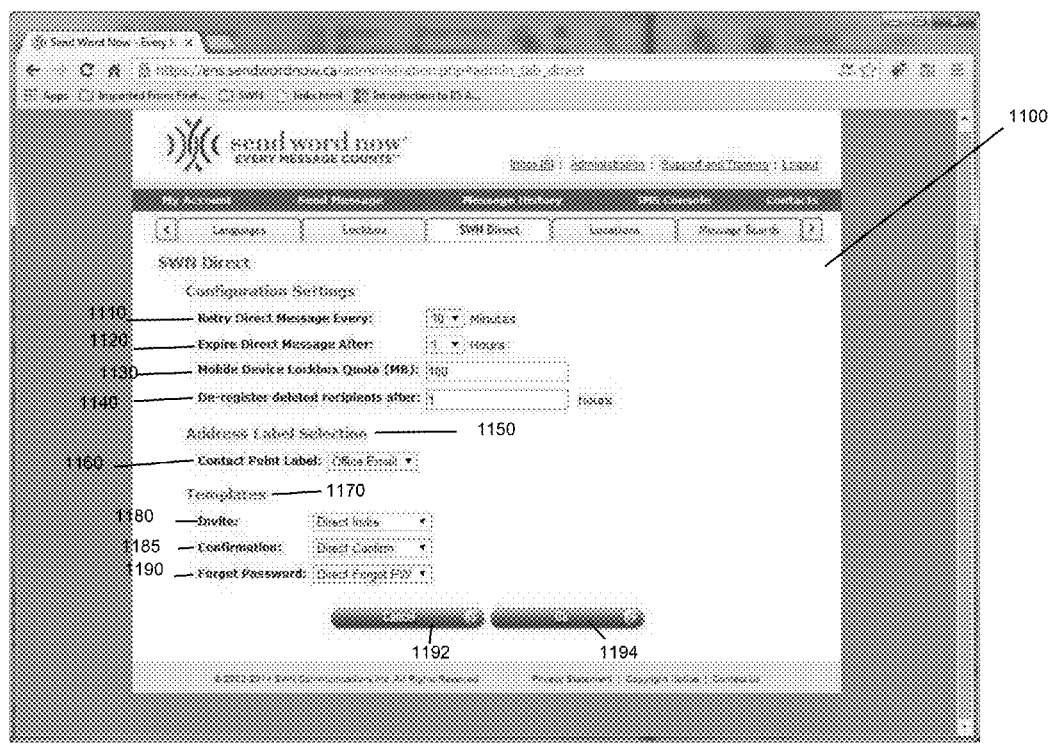
FIG. 11 shows a configuration settings interface according to one embodiment of the disclosed invention.

FIG. 11 depicts a configuration settings interface 1100 wherein after selecting the direct feature (also referred to as the SWN direct feature) from the set of message delivery features 648 shown in FIG. 6. The method may further comprise the step of scheduling a periodic message re-delivery after selecting the direct feature to attempt repeated delivery of an undelivered message. The sender may schedule the periodic message re-delivery of an undelivered message. For example, the sender can configure a time integral to retry direct message delivery. Also by example, setting 1110 indicates retry direct message every 10 minutes, and setting 1120 indicates expire direct message after one hour. Furthermore, the sender may configure setting 1130 indicating to limit the mobile device lockbox quota to 100 MB. This setting places a limit on the amount of recipient mobile device memory that may be used to store lockbox files. The sender may configure setting 1140 to de-register deleted recipients after certain period of time. The sender may configure address label selection 1150 by selecting contact point label setting 1160 in addition to selecting templates for invite, confirmation and confirm password attributes (depicted as 1180, 1185 and 1190). The sender may save the configuration by selecting ok option 1194, or proceed without saving the configuration changes by selecting cancel option 1192.

Figure 12:
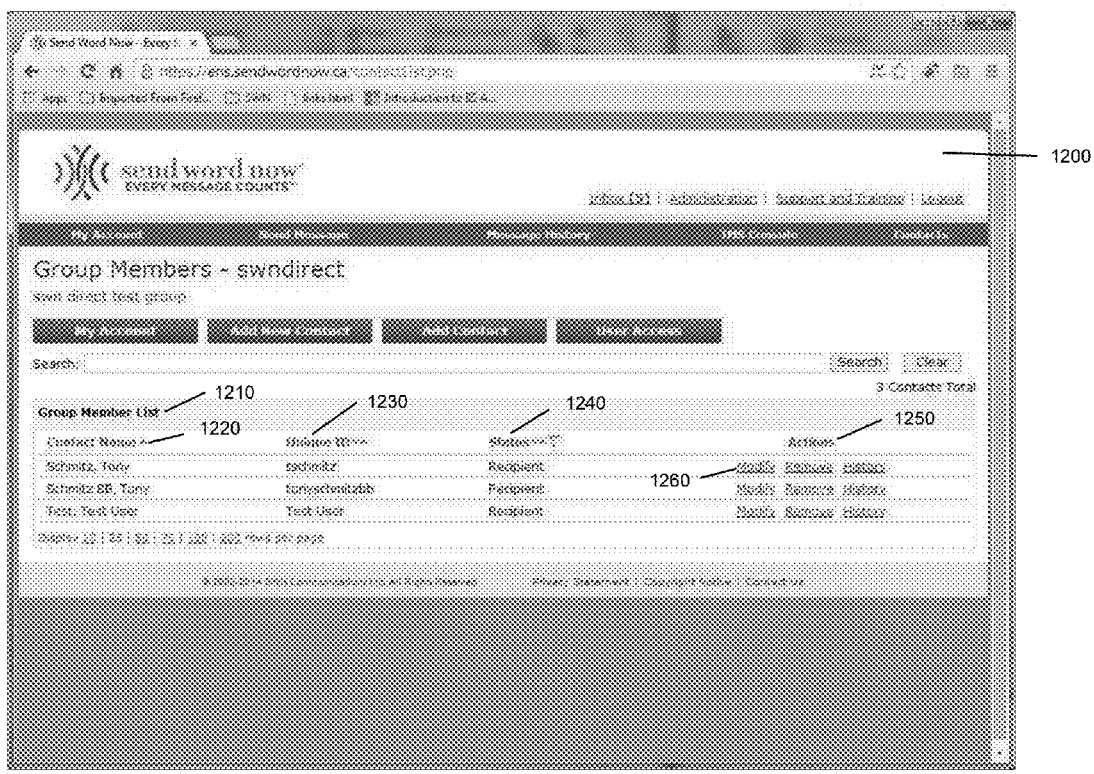
FIG. 12 depicts an interface resulting from the sender selecting a view link action option 285 for the swndirect group in FIG. 2.

FIG. 12 depicts an interface resulting from the sender selecting a view link action option (under action 285) for the swndirect group in FIG. 2. Now referring back to FIG. 2, if the sender selects a view link action option (under action 285) for the swndirect group in FIG. 2, then the interface 1200 illustrated in FIG. 12 is displayed to the sender.

The interface 1200 may present group member list 1210 displaying information about the members of the group swndirect. In particular, the interface 1200 may display contact name 1220, unique identification number of the contact 1230, status indicator of the contact 1240 and actions 1250 that can be performed on a given contact. In other words, the sender may remove a contact, modify a contact or view history of a contact.

Figure 13:
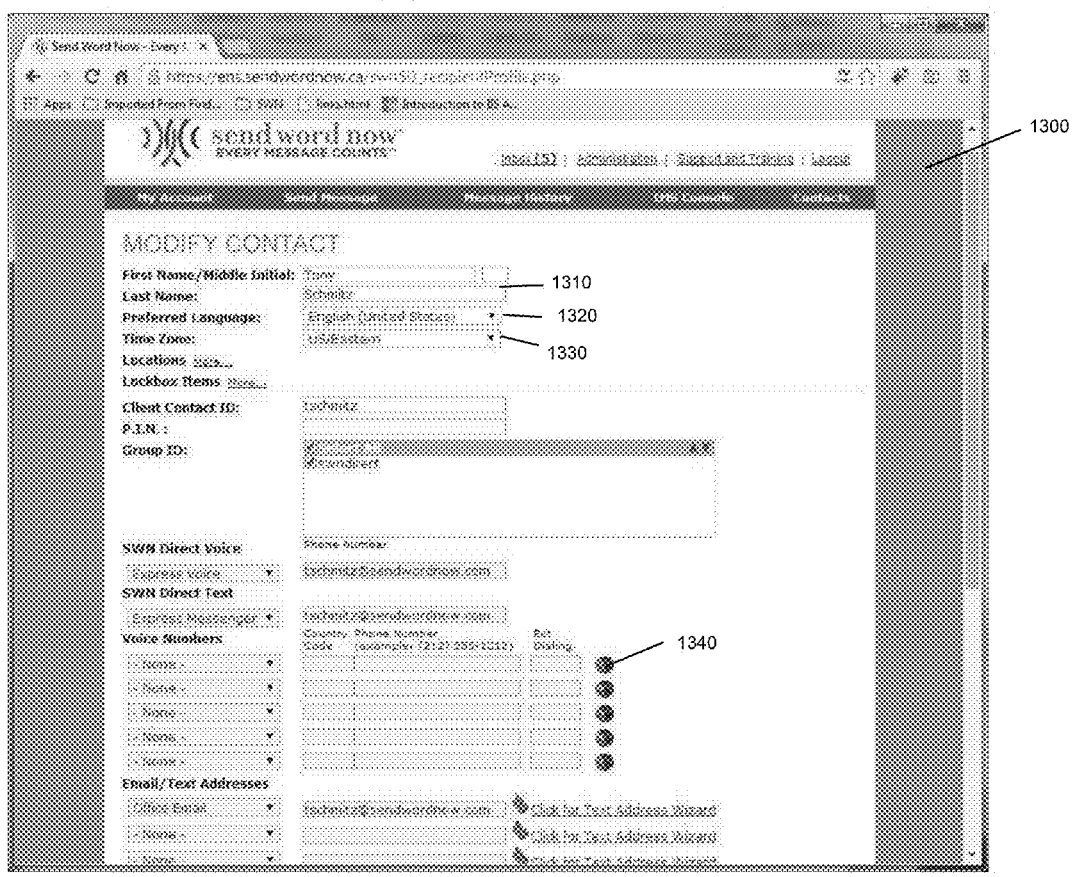
FIG. 13 shows a modify contact interface according to a preferred embodiment of the disclosed invention.

FIG. 13 shows a modify contact interface according to a preferred embodiment of the disclosed invention. Interface 1300, as shown in FIG. 13, is displayed if the sender selects a modify option for contact named Tony Schmitz. The interface 1300 may allow the sender to change name 1310, preferred language 1320, time zone settings 1330, phone number 1340, and other information for a particular contact.

Figure 14:
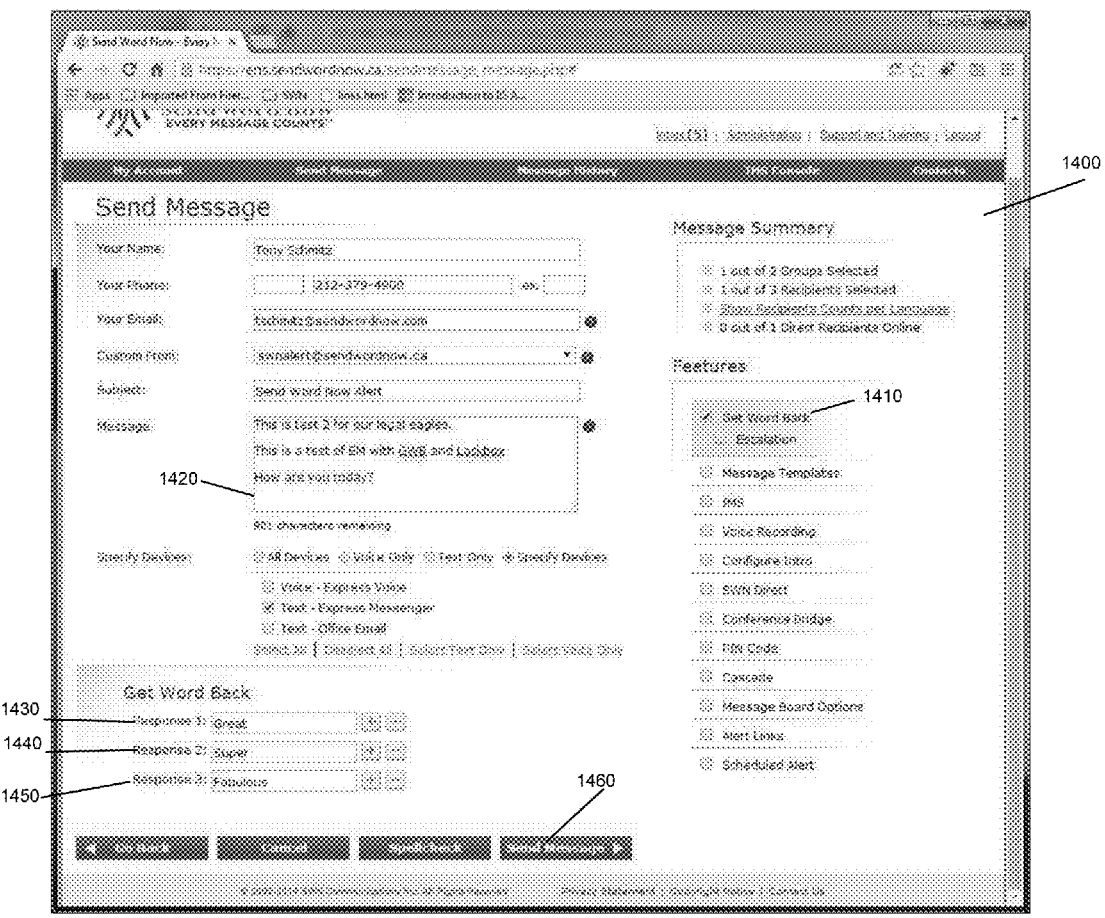
FIG. 14 depicts an example of the sender selecting the get word back option according to a preferred embodiment of the disclosed invention.
Figure 15:
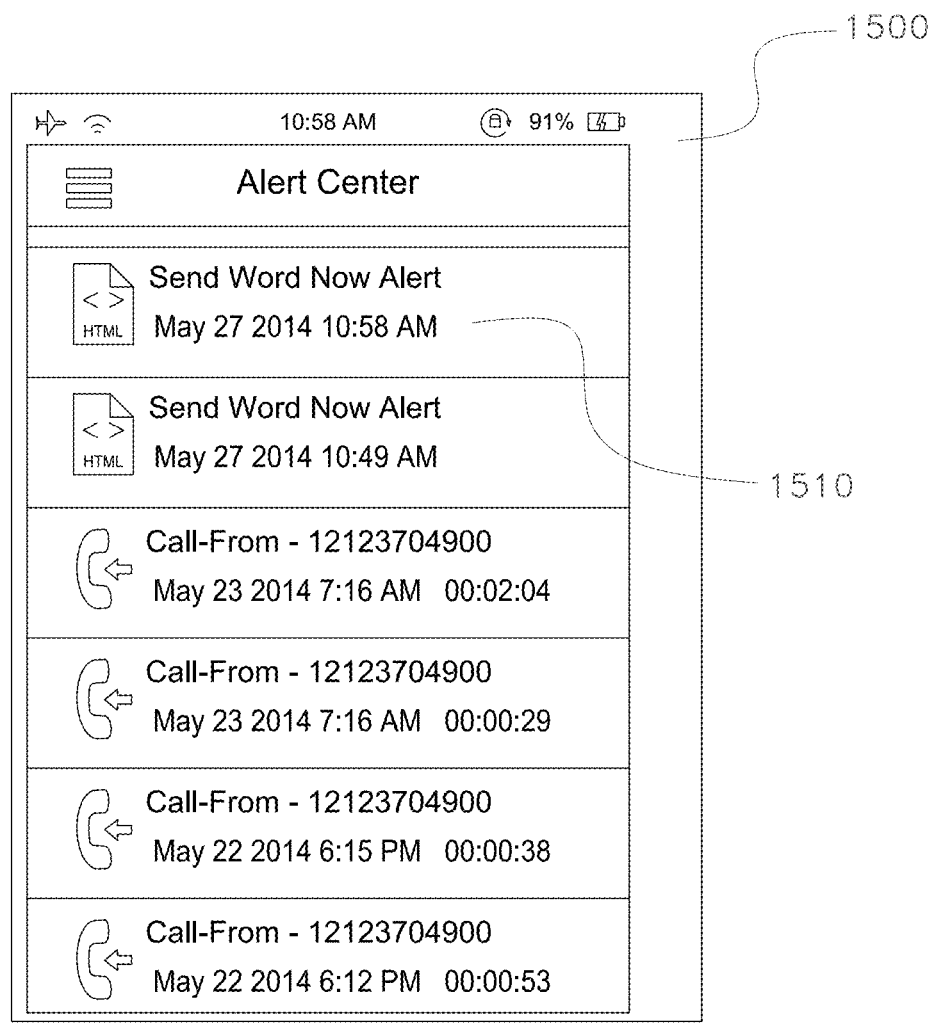
FIG. 15 illustrates an interface of an alert center notification on a mobile telephone of a recipient.

FIG. 14 depicts another example of the sender composing the message while selecting the get word back option 1410 according to a preferred embodiment of the disclosed invention. This is a two way communication link between a sender and at least one recipient wherein one of the provided choices may be selected by the recipient in order to provide a feedback to the sender. The sender has defined a query 1420 stating "how are you today?" The sender has also configured three responses to the query wherein the first response 1430 states "great", the second response 1440 states "super" and the third response 1440 states "fabulous". If the sender selects send message option 1460 option after configuring the three responses then interface 1500 is displayed at the recipient mobile phone as illustrated in FIG. 15. The term mobile phone and cellular phone are interchangeable and intended to denote the same, as would be appreciated by one of ordinary skill in the art.

FIG. 15 illustrates an exemplary interface of alert center notification on a cellular telephone of a recipient. The interface 1500 shows an example of a cellular telephone interface of a recipient where a message dispatch notification 1510 is displayed in response to the received message from the sender. Notably, message dispatch notification 1510 is displayed at the interface 1500 in FIG. 15 after the sender selection send message option 1460 displayed in FIG. 14. Similarly, interface 1600 depicted in FIG. 16 is displayed in response to the recipient selecting on message 1510 in FIG. 15.

Figure 16:
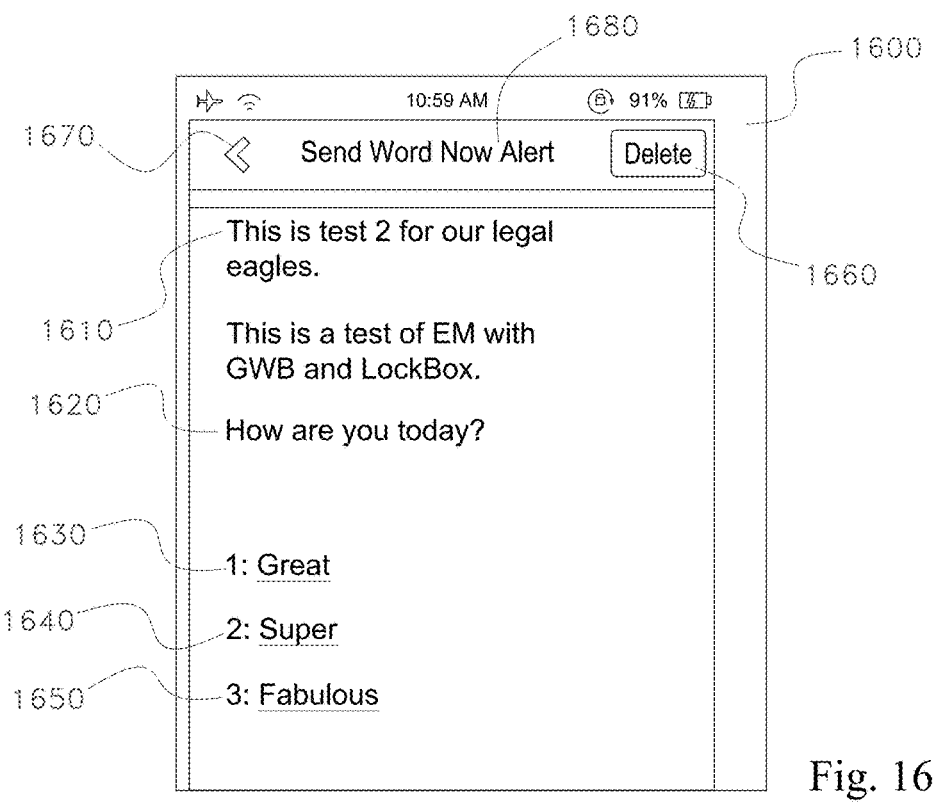
FIG. 16 shows an interface displaying the newly received alert on the recipient mobile device.

Referring now to FIG. 16 showing an exemplary interface 1600 displaying the newly received alert 1680 on the cellular telephone of the message recipient. The interface 1600 shows an example of a cellular telephone interface of a recipient where a message body text 1610 is displayed along with the sender defined query 1620. Further the interface 1600 also presents the three responses configured by the sender: the first response 1630 stating "great", the second response 1640 stating "super," and the third response 1650 stating "fabulous." The recipient may select one of the three responses, and communicate the selection to the sender. After selecting a response or without selecting a response, the recipient may select to delete the message by selecting the delete option 1660. The recipient may return to the alert center by selecting an arrow 1670.

Figure 17:
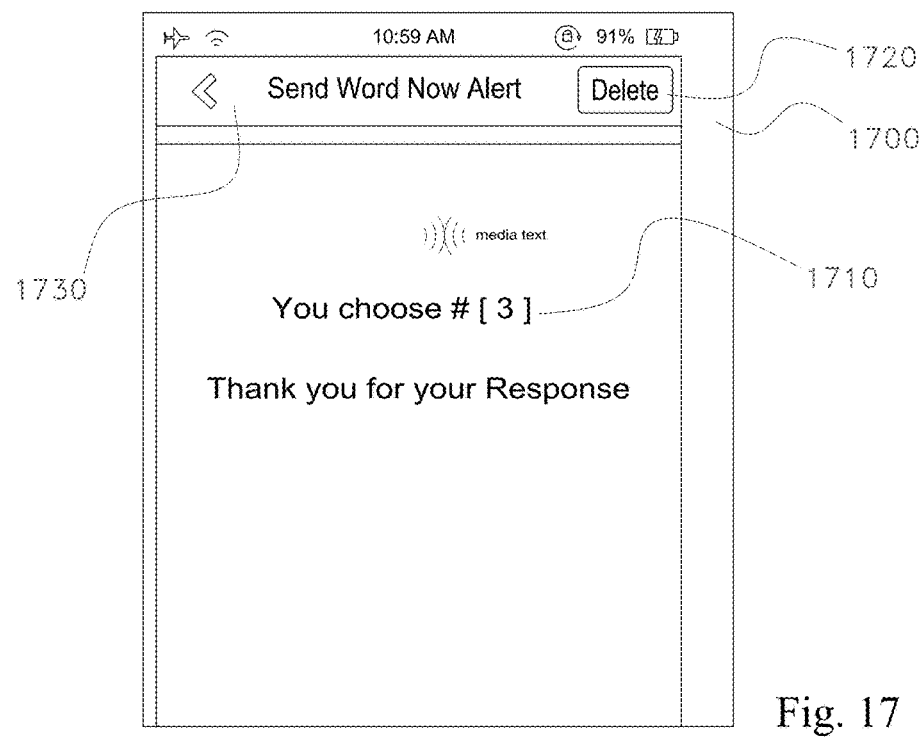
FIG. 17 illustrates an interface displaying the recipient's response selection.

FIG. 17 shows an exemplary interface 1700 displaying the recipient's response selection. It appears from the response selection acknowledgement 1710 displayed on the interface 1700 that the recipient had selected the third response 1650 in response to the sender's query 1620. At this point the recipient may delete the response selection acknowledgement 1710 by selecting the delete option 1720. The recipient may return to the alert center by selecting an arrow 1730.

Figure 18:
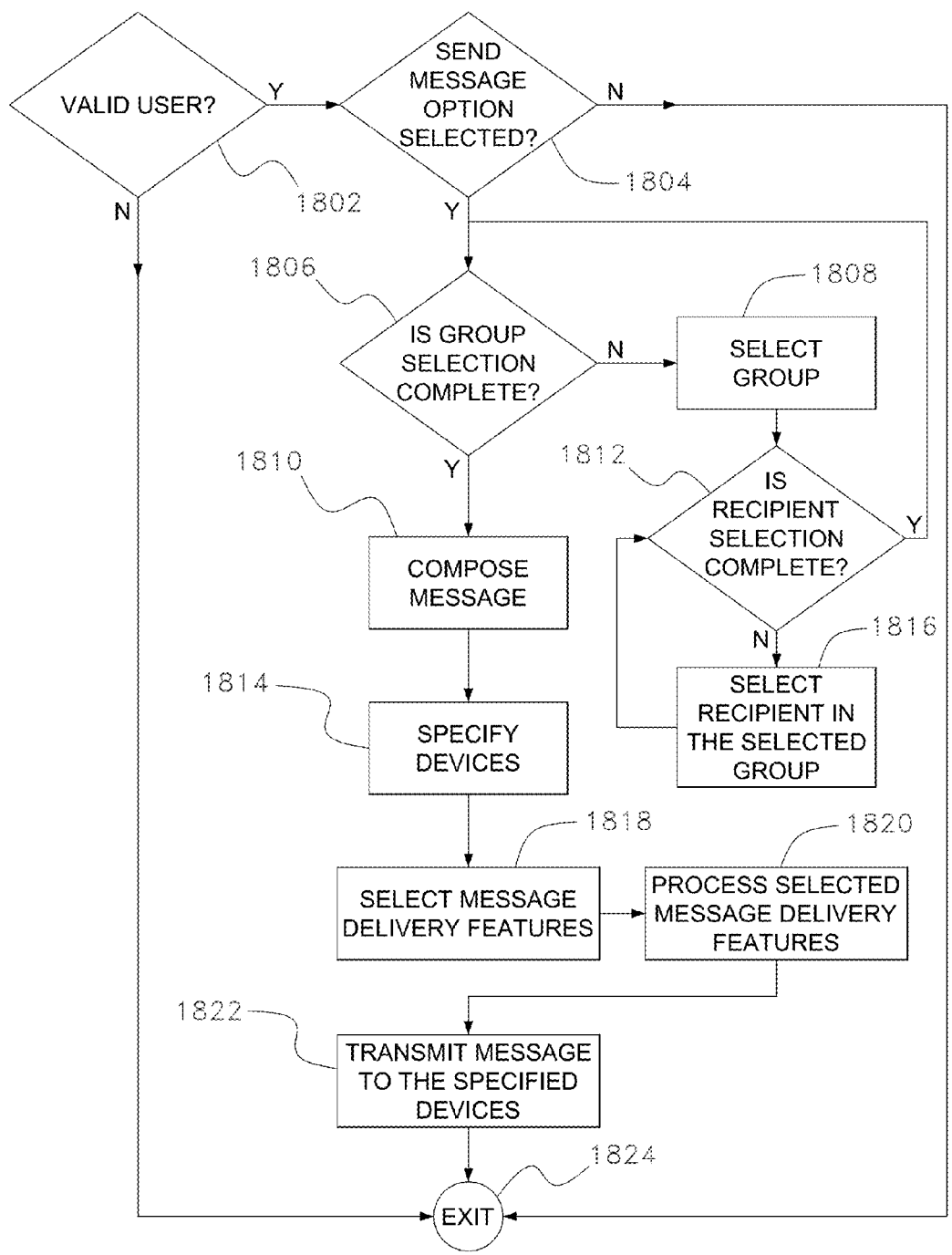
FIG. 18 illustrates a control flow chart depicting various operations performed while sending messages according to a preferred embodiment of the disclosed invention.

FIG. 18 illustrates an exemplary control flow chart depicting various operations performed while sending messages according to a preferred embodiment of the disclosed invention. At block 1802, the process ascertains the credentials of the sender via a login and password check. If the sender is a valid user, then the process moves to the send message option selected? block 1804, otherwise the process exits at block 1824. At block 1806, the process determines whether group selection is complete by iteratively prompting the sender to select a group until the sender indicates conclusion of the group selection. The process moves to block 1808 to select additional groups if the group selection is not complete. Then the process moves to block 1812 to check if the recipient selection is complete. If the recipient selection is complete, then the process moves back to block 1806, otherwise the process moves to block 1816 to select additional recipients.

Once the group selection is complete the process moves from block 1806 to block 1810 to compose a message for the recipient. After composing the message, the process moves from block 1810 the process moves to block 1814 to specify recipient devices where the composed message is to be dispatched. Thereafter the process moves to block 1818 to select message delivery features before moving to block 1820 to process the selected message delivery options. Then the process transmits the message to the specified devices and presents an alert notification on the specified device at block 1822 before exiting at block 1824.

Advantageously, the disclosed methods and systems provide economic message transmission offering unlimited characters and contents along with formatting options, message tracking ability and return receipt notification. Furthermore, the disclosed method guarantees delivery, provides delivery scheduling, a vanish option and diagnostic support.

We claim:

1. A method for secure message transmission from a computing device of a sender to at least one recipient, the computing device comprising a logic circuit configured to execute instructions causing the sender to perform the following operations:
   iteratively selecting a group until the sender indicates conclusion of the group selection to provide a selected group by executing a group selection instructions at the computing device;
   selecting at least one recipient from each selected group to provide at least one selected recipient by executing a recipient selection instructions at the computing device;
   composing a message by inputting into the computing device of the sender the sender contact information, a message subject and message text to provide a composed message by executing a message input instructions at the computing device;
   selecting at least one device for each of the at least one selected recipients to provide at least one selected device, wherein the composed message is to be dispatched to the at least one selected device by executing a recipient device selection instructions at the computing device; and
   indicating an alert notification on each the at least one selected devices of the recipient, wherein the alert notification indicates dispatch of the composed message to each of the at least one selected devices by executing an alert notification display instructions at the computing device.

2. The method of claim 1, further comprising the step of selecting at least one of: all of the at least one devices of the recipient, voice devices of the recipient, or text devices of the recipient for dispatching the composed message.

3. The method of claim 2, further comprising the step of selecting a specify devices option to select at least one of: express voice device of the recipient, express messenger device of the recipient, or the office email device of the recipient for dispatching the composed message.

4. The method of claim 1, further comprising the step of the sender defining the message transmission attributes by selecting message delivery features.

5. The method of claim 4, further comprising the step of selecting at least one of: a get word back feature, message template feature, instant message service feature, voice recording feature, configure intro feature, direct feature, conference bridge feature, PIN code feature, cascade feature, message board options feature, alert links feature, or schedule alert feature for defining the message transmission attributes.

6. The method of claim 5, further comprising the step of selecting a get word back feature to establish a two way communication link between the sender and the at least one selected recipient.

7. The method of claim 6, further comprising the steps of:
   defining, by the sender in a computing device, at least one query and at least two responses to provide at least one defined query and at least two defined responses;
   presenting the at least one defined query and the at least two defined responses to the recipient, the recipient answering the at least one defined query by selecting at least one of the at least two defined responses to provide selected responses; and communicating the selected responses to the computing device of the sender.

8. The method of claim 1, further comprising the steps of: selecting a vanish option step for delivering the composed message to at least one selected device, wherein the vanish option causes secured dispatch of the composed message.

9. The method of claim 8, further comprising the step of: causing the composed message to vanish upon the recipient viewing the composed message.

10. The method of claim 5, further comprising scheduling a periodic message re-delivery after selecting the direct feature to attempt repeated delivery of an undelivered message.

11. The method of claim 1, wherein the composed message is a rich text supported HTML message.

12. The method of claim 1, further comprising the step of providing a delivery receipt on a computing device of a sender, wherein the delivery receipt indicates delivery, or non-delivery, of the composed message to each of the at least one selected devices.

13. The method of claim 1, further comprising the step of providing an audience visibility indicator on a computing device of a sender, wherein said audience visibility indicator indicates, for each composed message to be dispatched to the at least one selected device, that the selected device is immediately reachable or is unavailable.

14. The method of claim 1, further comprising the step of encrypting the composed message end-to-end.

15. A secure message transmission system for dispatching messages from a computing device of a sender, the system comprising a memory and a logic circuit coupled to the memory configured to execute instructions causing the sender to perform the following operations:
   iteratively select a group until the sender indicates conclusion of the group selection to provide a selected group by executing a group selection instructions at the computing device;
   accept a selection of at least one recipient from each selected group to provide at least one selected recipient by executing a recipient selection instructions at the computing device;
   accept a message input by the sender into the computing device and including at least the sender contact information, a message subject and message text to provide a composed message by executing a message input instructions at the computing device;
   accept a selection by the sender into the computing device of at least one device for each selected recipient to provide at least one selected device, and dispatching the composed message to each of the at least one selected devices by executing a recipient device selection instructions at the computing device; and
   indicate an alert notification on each of the at least one selected devices, wherein the alert notification indicates dispatch of the composed message to each of the at least one selected devices by executing an alert notification display instructions at the computing device.

16. The system of claim 15, further configured to accept a selection, for dispatching the composed message, by the sender into a computing device, of at least one of: all devices of the recipient, voice devices of the recipient, or text devices of the recipient.

17. The system of claim 15, further configured to accept a specify devices option, by the sender into a computing device, to select at least one of: express voice device of the recipient, express messenger device of the recipient, or office email device of the recipient for dispatching the composed message.

18. The system of claim 15, wherein the composed message has defined message transmission attributes.

19. The system of claim 15, wherein the composed message has selected message delivery features.

20. The system of claim 18, further configured to accept a selection, by a sender into a computing device, of at least one of: a get word back feature, message template feature, instant message service feature, voice recording feature, configure intro feature, direct feature, conference bridge feature, PIN code feature, cascade feature, message board options feature, alert links feature, or schedule alert feature to define the message transmission attributes.

21. The system of claim 20, wherein the get word back feature is selected to establishes a two way communication link between the sender and the recipient.

22. The system of claim 21, wherein the system is configured to accept an input, by a sender into a computing device, to define at least one query and at least two responses to provide at least one defined query and at least two defined responses, to present the at least one defined query and the at least two defined responses to at least one selected device, the selected recipient inputs to answer the defined query by selecting at least one of the at least two defined responses in the selected device to provide a response selection, and the selected device communicates the response selection to the computing device of the sender.

23. The system of claim 19, further configured to accept a selection of the direct feature and a vanish option, by the sender into a computing device, to securely deliver the composed message to at least one selected device, wherein the composed message is securely dispatched.

24. The system of claim 23, wherein the composed message is deleted from the selected device after the selected recipient views the composed message.

25. The system of claim 19, further configured to select the direct feature and to schedule a periodic message re-delivery to attempt repeated delivery of an undelivered message.

26. The system of claim 15, wherein the composed message is a rich text supported HTML message.

27. The system of claim 15, further comprising a delivery receipt provided on a computing device of a sender, wherein the delivery receipt indicates delivery, or non-delivery, of the composed message to each of the at least one selected devices.

28. The system of claim 15, further comprising an audience visibility indicator on a computing device of a sender, wherein said audience visibility indicator indicates, for each composed message to be dispatched to the at least one selected device, that the selected device is immediately reachable or is unavailable.

29. The system of claim 15, wherein the composed message is encrypted end-to-end.

* * * * *